United States Patent [19]

Kaizuka

[11] Patent Number: 5,633,994
[45] Date of Patent: May 27, 1997

[54] COMPUTER AIDED MODELING TECHNIQUE FOR 3D FREE-FORM OBJECTS AND APPARATUS THEREOF

[75] Inventor: Hiroshi Kaizuka, Sagamihara, Japan

[73] Assignee: Nippon Steel Corporation, Tokyo, Japan

[21] Appl. No.: 400,998

[22] Filed: Mar. 9, 1995

[30] Foreign Application Priority Data

Mar. 11, 1994 [JP] Japan ................................ 6-067716

[51] Int. Cl.$^6$ ........................................ G06F 15/00
[52] U.S. Cl. .................................................. 395/119
[58] Field of Search ............................... 395/120, 141, 395/142, 119; 345/117, 118

[56] References Cited

PUBLICATIONS

J.F. Blinn, A Generalization of Algebraic Surface Drawing, ACM Transaction on Graphics, vol. 1(3), pp. 235–256, 1982.

H. Nishimura et al., Object Modeling by Distribution Function and a Method of Image Gerneration, Trans. IEICE Japan, J68–D(4), pp. 718–725, 1985.

G. Wyvill et al., Data Structure for Soft Objects, The Visual Computer, 2(4) pp. 227–234, 1986.

A. Rockwood, "Accurate Display of Tensor Product Isosurfaces, In Proceeding of the First IEEE Conference on Visualization" Visulation '90, pp. 353–360.

Y. Yamaguichi, Probalistic Solid Modeling: A New Approach for Handling Uncertain Shapes, Elsevier Science Publishers B. V., pp. 95–108, 1993.

Primary Examiner—Phu Nguyen
Attorney, Agent, or Firm—Pollock, Vande Sande & Priddy

[57] ABSTRACT

A set of points (x,y,z) satisfying relation $F(x,y,z)=a$, where $F(x,y,z)$ represents density distribution in a 3D space x-y-z, is defined as a surface of object, a set of points (x,y,z) satisfying relation $F(x,y,z)>a$ as an outside of object and a set of points (x,y,z) satisfying relation $F(x,y,z)<a$ as an outside of object. Density distribution $c(x,y,z)$ generated by the designer and density distribution $Fq(x,y,z)$ already existing in the space are blended according to equation $Gq(x,y,z)= \Psi(Fq(x,y,z), c(x,y,z))$ using a smooth function $\Psi(\xi, \zeta)$ having two variables $\xi, \zeta$, thereby generating density distribution $Gq(x,y,z)$. Sampling data $\Lambda_q$ up to the mth-order partial derivative of the density distribution $Gq(x,y,z)$ is determined on a finite number of points in the 3D space. A smooth function $Fq(x,y,z)$ for interpolating this sampling data $\Lambda_q$ is generated, and new density distribution $Fq(x,y,z)$ is expressed by the generated function, thereby updating the density distribution $Fq(x,y,z)$. The density distribution $F(x,y,z)$ obtained by convex combination of a number n of smooth functions $Fq(x,y,z)$ (q=1, 2, . . . , n) at each coordinate point is assumed to be density distribution $F(x,y,z)$ for expressing an object.

11 Claims, 5 Drawing Sheets

COMPUTER AIDED MODELING TECHNIQUE FOR 3D FREE-FORM OBJECTS AND APPARATUS THEREOF

BACKGROUND OF THE INVENTION

1. Field of the Invention

The present invention relates to a modeling technique for three-dimensional (3D) free-form objects and an apparatus thereof, or more in particular to a method of realizing a solid modeler capable of modeling a three-dimensional object composed of free-form curved surfaces with a sensation as flexible as clay in generating three-dimensional object data for the three-dimensional computer graphics used for industrial or artistic designs and movie and television applications.

2. Description of the Related Art

With the progress of the graphics workstations, the 3D computer graphics technique has come to be widely used in various fields of industry and art. Especially, in recent years, the modeling of three-dimensional objects using free-form curved surfaces is increasingly required.

As such a technique, a method of generating free-form curved surfaces has been eagerly investigated in the field of CAD (Computer Aided Design), for which free-form curved surfaces have actually been widely used. The free-form curved surface used for CAD, however, is a two-dimensional open curved surface in most cases, and there has been no conventional method of effectively modeling closed curved surfaces, i.e., three-dimensional objects having free-form curved surfaces.

Especially, it has so far been very difficult to form a hole in or attach a handle to an existing 3D object or otherwise modify the geometric topology while retaining the smoothness of the shape of such an object.

In view of this, a modeling technique has been suggested in which a smooth density function F(x,y,z) is defined in three-dimensional space x-y-z while at the same time the representation by implicit functions is employed for defining the inside, the surface and the outside of object in the following manner. (J. F. Blimm, ACM Transaction on Graphics, 1(3), pp. 235–256, 1982; H. Nishimura et al., Trans. IEICE Japan, J68-D(4), pp. 718–725, 1985; G. Wyvill et al., The Visual Computer, 2(4), pp. 227–234, 1986)

Inside of object: Region satisfying F(x,y,z)>0.5

Surface of object: Region satisfying F(x,y,z)=0.5

Outside of object: Region satisfying F(x,y,z)<0.5

The aforementioned modeling technique is typically represented by a method in which the density distribution is corrected smoothly in the manner described below. Several field-generating primitives, each of which has a smooth density distribution and is usable by the user, are prepared. The user arranges these field-generating primitives while adjusting the sign and gradient of the density and the size at an arbitrary spatial position with an arbitrary orientation. The density distribution of these field-generating primitives is added to the density distribution already existing in the space.

As shown in FIG. 1A, for example, in the case where it is desired to form a through hole at the center of an ellipsoid A expressed by Equation 1.1, an ellipsoid primitive B having a negative density given by Equation 1.2 is arranged at the center of the ellipsoid A to generate a new density distribution F(x,y,z) expressed by Equation 1.3. Thus an ellipsoid A-B having a through hole formed therein is obtained as shown in FIG. 1B.

$$C_A(x,y,z)=0.5 \cdot \exp[1-(x^2+y^2+4z^2)] \quad (1.1)$$

$$C_B(x,y,z)=-0.5 \cdot \exp[1-(4x^2+4y^2+(0.5z)^2)] \quad (1.2)$$

$$F(x,y,z)=C_A(x,y,z)+C_B(x,y,z) \quad (1.3)$$

Except for the points with a gradient vector of zero for density function, an isosurface having the density of 0.5 automatically generates a smooth surface. According to this method, the object A-B with the through hole different in topology from the original ellipsoid is readily modeled.

In the above-mentioned modeling technique using the implicit function, however, the use of simple density addition is often accompanied by the fact that a positive or negative density distribution with a large absolute value is exhibited for other than visual surfaces (object surfaces) with the density of 0.5. In the case where a new object is modeled in such a spatial region, a shape not intended by the designer may undesirably be generated.

In the case shown above, for example, the density value F(0, 0, 0.7) at a point (0, 0, 0.7) in proximity to the through hole of the ellipsoid A-B is −1.010 ... Therefore, an attempt to place an ellipsoid C represented by Equation 1.4 at the center of the through hole as shown in FIG. 1C results in F(0, 0, 0.7)+Cc(0, 0, 0.7)=0.307 ... .<0.5 since Cc(0, 0, 0.7)= 1.318 ....

$$C_C(x,y,z)=0.5 \cdot \exp[1-(16x^2+16y^2+(0.25z)^2)] \quad (1.4)$$

The point (0, 0, 0.7) is the outside of object, and therefore the ellipsoid C is fragmented into three portions as shown in FIG. 1D against the will of the designer. As a consequence, the designer is required to proceed with the modeling work by awkward means while always monitoring the behavior of density distribution in the space in addition to the shape (that is the visual surface) of the object.

Also, in the case where it is desired to twist, bend or otherwise deform an object having density distribution composed of a plurality of field-generating primitives, the density distribution after deformation is greatly complicated. The conventional modeling technique using the implicit function representation is intended only for the density distribution capable of being expressed by a combination of addition and subtraction of limited types of field-generating primitives. Thus the problem is how to combine the usable field-generating primitives to express the density distribution after deformation.

Consider the simplest case in which a peanut-like shape is generated by bending a single ellipsoid primitive. How the addition and subtraction of a plurality of ellipsoid primitives are combined to represent the peanut-like shape is not a simple problem. The deforming operation for an object cannot be used in the course of modeling work according to the prior art.

SUMMARY OF THE INVENTION

In view of the the above-mentioned problems, the object of the present invention is to provide a method of modeling 3D free-form objects in which the geometric topology of an object can be modified freely and the operation of deforming the object can be freely utilized thereby to construct a modeling work environment enabling the designer to input his sensitivity straightforward and efficiently into computer.

In order to obviate the above-mentioned problems of the prior art, according to one aspect of the invention, there is provided a computer aided modeling technique for three-dimensional free-form objects, comprising the steps of:

defining density distribution F(x,y,z) in a 3D space x-y-z;

determining a scalar quantity a;

defining a set of points (x,y,z) satisfying relation F(x,y,z)=a as a surface of object;

defining a set of points (x,y,z) satisfying relation F(x,y,z)>a as an inside of object;

defining a set of points (x,y,z) satisfying relation F(x,y,z)<a as an outside of object;

producing density distribution c(x,y,z) by arranging a field-generating primitive prepared by a system or a user in a desired orientation and at a desired position;

generating density distribution Gq (x,y,z) by blending the produced density distribution c (x,y,z) with density distribution Fq(x,y,z) (q=1, 2, ......, n) already existing in the space, using a smooth function $\Psi(\xi, \zeta)$ having two variables $\xi, \zeta$ in the manner as shown by equation Gq (x,y,z)=$\Psi$(Fq (x,y,z), c (x,y,z));

sampling up to the mth-order partial derivative of the generated density distribution Gq (x,y,z) with respect to points included in a set $\Xi q$ having a finite number of points in the 3D space, thereby determining sampling data $\Lambda_q$ (where the sampling data $\Lambda_q = \{\mu_p(i,j\ k) = \{1/(i!j!k!)\}\partial^{i+j+k}G_q(x_p, y_p, z_p)/\partial x^i \partial y^j \partial z^k | i+j+k=0, 1, \ldots, m, i \geq 0, j \geq 0, k \geq 0$; all the points $P=(x_p, y_p, z_p)$ included in $\Xi q\}$) and generating a smooth density distribution function Fq(x,y,z) for interpolating the determined sampling data $\Lambda q$ and expressing new density distribution Fq(x,y,z) with the generated function thereby to update the density distribution Fq(x,y,z);

wherein density distribution F(x,y,z) obtained by convex combination of a number n of smooth functions Fq(x,y,z) (q=1, 2, ...., n) at each coordinate point is assumed to be density distribution F(x,y,z) representing an object. That is to say, the density distribution F(x,y,z) is expressed by the following equation:

$$F(x,y,z) = \sum_{q=1}^{n} \lambda_q(x,y,z) \cdot F_q(x,y,z)$$

where a function $\lambda q(x,y,z)$ (q=1, 2, ......, n) is a smooth non-negative function and satisfies the following equation:

$$\sum_{q=1}^{n} \lambda_q(x,y,z) \equiv 1$$

According to another aspect of the invention, there is provided a computer aided modeling technique for 3D free-form objects, comprising in a configuration of the field-generating primitive the steps of:

determining the scalar quantity a as a value satisfying the relation a>0; and determining the density distribution c(x,y,z) of the field-generating primitive from equation c(x,y,z)=$\phi$(f(x,y,z)−b+a) using a smooth function f(x,y,z) and a smooth monotone increasing function $\phi(\xi)$ satisfying equations $0 \leq \phi(\xi) \geq 2a$ and $\phi(a)=a$, the function f(x,y,z) being used for defining a set of points (x,y,z) satisfying the relation f(x,y,z)=b as the surface of object, defining a set of points (x,y,z) satisfying relation f(x,y,z)>b as the inside of the object, and defining a set of points (x,y,z) satisfying the relation f(x,y,z)<b as the outside of object, with regard to a scalar quantity b.

According to still another aspect of the invention, there is provided a computer aided modeling technique for 3D free-form objects, comprising the steps of:

determining the scalar quantity a as a value satisfying relation a>0;

defining the function c(x,y,z) as follows using a function d associated with a smooth bijection (one-to-one onto-mapping) d: $R_1 \rightarrow R_2$ from region $R_1$ to region $R_2$ in the 3D space and smooth inverse mapping $d^{-1}$. $R_2 \rightarrow R_1$ c(x,y,z)=F($d^{-1}$(x,y,z))

(point (x,y,z) included in the region $R_2$)

c(x,y,z))=0

(point (x,y,z) not included in the region $R_2$)

regarding the defined function c(x,y,z) as the density distribution of the field-generating primitive;

updating the density distribution Fq(x,y,z) according to equation Fq(x,y,z)−{Fq(x,y,z)·D(x,y,z)/(2a)} using density distribution D(x,y,z) of the field-generating primitive approximating the region $R_1$ in surface shape; and blending the updated density distribution Fq(x,y,z) and the field-generating primitive c(x,y,z) according to the following equation, thereby generating density distribution Gq(x,y,z) and realizing a deformation of the object:

$$Gq(x,y,z)=Fq(x,y,z)+c(x,y,z)-\{Fq(x,y,z)\cdot c(x,y,z)/(2a)\}.$$

According to yet another aspect of the invention, there is provided a computer aided modeling technique for 3D free-form objects, comprising the steps of:

defining density distribution F(x,y,z) in a 3D space x-y-z;

determining a scalar quantity a;

defining a set of points (x,y,z) satisfying relation F(x,y,z)=a as a surface of object;

defining a set of points (x,y,z) satisfying relation F(x,y,z)>a as an inside of object;

defining a set of points (x,y,z) satisfying relation F(x,y,z)<a as an outside of object;

arranging a field-generating primitive prepared by a system or a user in a desired orientation and at a desired position thereby to produce density distribution c(x,y,z);

blending the produced density distribution c(x,y,z) with density distribution Fq(x,y,z)(q=1, 2, . . . . n) already existing in the space thereby to generate density distribution Gq(x,y,z);

sampling up to the mth-order partial derivatives of the generated density distribution Gq(x,y,z) with respect to points included in a set $\Xi q$ having a finite number of points in the 3D space thereby to determine sampling data $\Lambda q$;

generating a smooth density distribution function Fq(x,y,z) for interpolating the determined sampling data $\Lambda q$ and expressing new density distribution Fq(x,y,z) with the generated function thereby to update the density distribution Fq(x,y,z); and assuming density distribution F(x,y,z) obtained by convex combination of a number n of smooth density distribution functions Fq(x,y,z)(q=1, 2, . . . , n) at each coordinate point as density distribution F(x,y,z) representing an object.

According to a further aspect of the invention, there is provided a computer aided modeling technique for 3D free-form objects, comprising the steps of:

defining density distribution F(x,y,z) in a 3D space;

determining a scalar quantity a;

defining a set of points (x,y,z) satisfying relation F(x,y,z) =a as a surface of object;

defining a set of points (x,y,z) satisfying relation F(x,y,z) >a as an inside of object;

defining a set of points (x,y,z) satisfying relation F(x,y,z) <a as an outside of object;

arranging a field-generating primitive prepared by a system or a user in a desired orientation and at a desired position thereby to produce density distribution c(x,y,z);

blending the produced density distribution c(x,y,z) with density distribution Fq(x,y,z) (q=1, 2, . . . , n) already existing in the space using a smooth function $\Psi(\xi, \zeta)$ having two variables $\xi, \zeta$ according to equation Gq(x,y,z)=$\Psi$(Fq(x,y,z), c(x,y,z)) thereby to generate density distribution Gq(x,y,z);

sampling up to the mth-order partial derivatives of the generated density distribution Gq(x,y,z) at points included in a set $\Xi$q having a finite number of points in the 3D space thereby to determine sampling data $\Lambda$q;

generating smooth density distribution function Fq(x,y,z) for interpolating the determined sampling data $\Lambda$q and expressing new density distribution Fq(x,y,z) with the generated function, thereby updating the density distribution Fq(x,y,z); and assuming that density distribution F(x,y,z) obtained by convex combination of a number n of smooth distribution functions Fq(x,y,z) (q=1, 2, . . . , n) at each coordinate point as density distribution F(x,y,z) representing an object.

According to a still further aspect of the invention, there is provided a computer aided modeling apparatus for three-dimensional free-form objects in which a set of points (x,y,z) associated with density distribution F(x,y,z) in a 3D space x-y-z satisfying relation F(x,y,z)=a is defined as a surface of object, a set of points (x,y,z) satisfying relation F(x,y,z)>a as an inside of object, and a set of points (x,y,z) satisfying relation F(x,y,z)<a as an outside of object, with regard to a scalar quantity a, comprising:

producing means for arranging a field generating primitive prepared by a system or a user in a desired orientation and at a desired position thereby to produce density distribution c(x,y,z);

generating means for blending the produced density distribution c(x,y,z) with density distribution Fq(x,y,z) (q=1, 2, . . . , n) already existing in the space using a smooth function $\Psi(\xi, \zeta)$ having two variables $\xi, \zeta$ in accordance with equation Gq(x,y,z)=$\Psi$(Fq(x,y,z), c(x,y,z)) thereby to generate density distribution Gq(x,y,z);

sampling data computing means for sampling up to the m-order partial derivatives of the generated density distribution Gq(x,y,z) at points included in a set $\Xi$q having a finite number of points in the 3D space, thereby determining sampling data $$\Lambda_q = \{\mu_p (i,j,k) = \{1/(i!j!k!)\} \partial^{i+j+k} G_q (x_p, y_p, z_p) / \partial x^i \partial y^j \partial z^k \mid i+j+k=0, 1, \ldots, m, i \geq 0, j \geq 0, k \geq 0;$$
all the points $P = (x_p, y_p, z_p)$ included in the set $\Xi q\}$);

and updating means for generating a smooth density distribution function Fq(x,y,z) for interpolating the determined sampling data $\Lambda$q and expressing new density distribution Fq(x,y,z) with the generated function, thereby to update the density distribution Fq(x,y,z), and assuming that density distribution obtained by the convex combination of a number n of smooth functions F(x,y,z) (q=1, 2, . . . , n) at each coordinate point as density distribution F(x,y,z) representing an object.

According to a yet further aspect of the invention, there is provided a computer aided modeling apparatus for three-dimensional free-form objects in which a set of points (x,y,z) associated with density distribution F(x,y,z) in a 3D space x-y-z satisfying relation F(x,y,z)=a is defined as a surface of object, a set of points (x,y,z) satisfying relation F(x,y,z)>a as an inside of object, and a set of points (x,y,z) satisfying relation F(x,y,z)<a as an outside of object, with regard to a scalar quantity a, comprising:

producing means for arranging a field generating primitive prepared by a system or a user in a desired orientation and at a desired position thereby to generate density distribution c(x,y,z);

generating means for blending the produced density distribution c(x,y,z) with density distribution Fq(x,y,z) (q=1, 2, . . . , n) already existing in the space thereby to generate density distribution Gq(x,y,z);

sampling data computing means for sampling up to the m-order partial derivatives of the generated density distribution Gq(x,y,z) at points included in a set $\Xi$q having a finite number of points in the 3D space thereby to determine sampling data $\Lambda$q; and updating means for generating a smooth function Fq(x,y,z) for interpolating the determined sampling data $\Lambda$q, expressing new density distribution Fq(x,y,z) with the generated function thereby to update the density distribution Fq(x,y,z) assuming that the density distribution obtained by the convex combination of a number n of smooth density distribution functions Fq(x,y,z) (q=1, 2, . . . , n) at each coordinate point as density distribution F(x,y,z) representing an object.

In order to explain the operation of this invention definitely, consider the case in which the density value a defining the surface of object is 0.5 and the thee-dimensional space x-y-z is initialized to density 0 at every point thereof.

According to this invention, in the configuration of the field generating primitive, the density distribution c(x,y,z) of the field generating primitive is defined as equation c(x,y,z)=$\theta$(f(x,y,z)−b+0.5) using the smooth monotone increasing function $\phi(\xi)$ satisfying the equations $0 \leq \phi(\xi) \leq 1$ and $\phi(0.5) = 0.5$ and the smooth function f(x,y,z) for defining the set of points (x,y,z) satisfying the relation f(x,y,z)=b as the surface of object, the set of points (x,y,z) satisfying the relation f(x,y,z)>b as the inside of object, and the set of points (x,y,z) satisfying the relation f(x,y,z)<b as the outside of object, with regard to the scalar quantity b. Consequently, the density distribution c(x,y,z) provides a smooth function and satisfies equation $0 \leq c(x,y,z) \leq 1$.

Further, three types of blend $\Psi_+, \Psi_-, \Psi_*$, shown below are defined, for example, as blend $\Psi$(Fq(x,y,z), c(x,y,z)) between the density distribution Fq(x,y,z) existing already in the space and the field generating primitive c(x,y,z), and the blending is effected in such a manner as shown by equation Gq(x,y,z)=$\Psi$(Fq(x,y,z), c(x,y,z)), thereby generating the density distribution Gq(x,y,z):

$$\Psi_+(F_q(x,y,z), c(x,y,z)) = F_q(x,y,z) + c(x,y,z) - F_q(x,y,z) c(x,y,z)$$

$$\Psi_-(F_q(x,y,z), c(x,y,z)) = F_q(x,y,z) - F_q(x,y,z) c(x,y,z)$$

$$\Psi_*(F_q(x,y,z), c(x,y,z)) = F_q(x,y,z) c(x,y,z)$$

where the blend $\Psi_+$ is a function for producing the sum of two objects as illustrated in FIG. 2A, the blend $\Psi_-$ is a function for producing the difference between two objects as shown in FIG. 2B, and the blend $\Psi_*$ is a function for producing a portion shared by two objects as illustrated in FIG. 2C.

In the process, in accordance with the smooth density distribution $c(x,y,z)$ satisfying the equation $0 \leq c(x,y,z) \leq 1$, each of the blends $\Psi_+$, $\Psi_-$, $\Psi_*$ produces smooth density distribution included in a range from the minimum to the maximum value of the density distribution $Fq(x,y,z)$ as a result of blending.

As a result, a field generating primitive satisfying the equation $0 \leq c(x,y,z) \leq 1$ in the space with the density distribution initialized to zero is arranged sequentially using the three types of blend described above to generate the density distribution $Gq(x,y,z)$. Up to the mth-order partial derivatives of the density distribution $Gq(x,y,z)$ are sampled at points included in the set $\Xi q$, and the resulting sampling data $\Lambda q$ are interpolated. In this way, the density distribution $Fq(x,y,z)$ is sequentially updated. Then, the following equation substantially holds although there may occur a minor error under the influence of approximation accuracy of the interpolation density distribution function $Fq(x,y,z)$.

$$0 \leq Fq(x,y,z) \leq 1$$

This is indicative of the fact that a large negative density caused by the ellipsoid primitive B is not retained in the space outside of the object in the vicinity of the through hole shown in FIG. 1B and that the density distribution is substantially cleared to zero in the space outside of the object except for the vicinity of the surface of the object.

Consequently, even in the case where the ellipsoid primitive C is arranged through the through hole as shown in FIG. 1C, fragmentation of the ellipsoid primitive C against the intent of the designer as shown in FIG. 1D, which has been the problem in the conventional techniques, does not occur, so that the ellipsoid primitive C can be arranged straightforward.

Also, taking the sum of two objects, a large positive density is not retained in the portion shared by the two objects. According to the present invention, therefore, a smooth density distribution is realized in such a manner that the inside of object except for the vicinity of the surface of object has a substantially uniform density value of 1, the outside of object except for the vicinity of the surface of object has a substantially uniform density value of 0, and the density value smoothly changes from 0 to 1 only in the vicinity of the surface of object. As a result, the designer can proceed with the modeling work concentrated on the shape of the object without paying attention to the density distribution in the total space or the edge rounding.

According to the present invention, the density distribution $G_q(x,y,z)$ generated as a result of the modeling operation by the designer is sampled up to the mth-order partial derivatives at points included in the set $\Xi_q$ having a finite number of points in the 3D space thereby to determine the sampling data $\Lambda q$ expressed by the following equation:

$$\Lambda_q = \{\mu_p (i,j,k) = \{1/(i!j!k!)\} \partial^{i+j+k} G_q (x_p, y_p, z_p) / \partial x^i \partial y^j \partial z^k \mid i+j+k = 0, 1, \ldots, m, i \geq 0, j \geq 0, k \geq 0;$$
all the points $P = (x_p, y_p, z_p)$ included in the set $\Xi q\})$ Next, the smooth density distribution function $F_q(x,y,z)$ for interpolating the sampling data $\Lambda q$ is generated thereby to update the density distribution $Fq(x,y,z)$. The convex combination of a number n of smooth density distribution functions $Fq(x,y,z)$ $(q=1, 2, 3, \ldots, n)$ is assumed to be the density distribution $F(x,y,z)$ representing an object. In the process, the density distribution $F(x,y,z)$ is given by the following equation:

$$F(x,y,z) = \sum_{q=1}^{n} \lambda_q(x,y,z) \cdot F_q(x,y,z)$$

where the function $\lambda q(x,y,z)$ $(q=1, 2, \ldots, n)$ is a smooth non-negative function satisfying the following equation.

$$\sum_{q=1}^{n} \lambda_q(x,y,z) \equiv 1$$

Thus, according to this invention, all the information relating to the density distribution is concentrated on the sampling data $\Lambda q$. Regardless of the modeling operation employed for updating the sampling data $\Lambda q$, therefore, the smooth density distribution $F(x,y,z)$ can be produced.

As to the deformation of an object shape which has been impossible to realize by the conventional techniques, the function $c(x,y,z)$ is defined as follows using the function d having a smooth bijection (one-to-one onto-mapping) from the region $R_1$ to the region $R_2$ as expressed by $d: R_1 \rightarrow R_2$ and the smooth reverse mapping $d^{-1}: R_2 \rightarrow R_1$ in the three-dimensional space.

$c(x,y,z)=F(d^{-1}(x,y,z))$ (point $(x,y,z)$ included in the region $R_2$)

$c(x,y,z)=0$ (point $(x,y,z)$ not included in the region $R_2$)

This function $c(x,y,z)$ is regarded as density distribution of the above-mentioned field generating primitive, so that the density distribution $D(x,y,z)$ of the field generating primitive with a surface shape approximating the region $R_1$ is blended with the density distribution $Fq(x,y,z)$ already existing in the space using the above-mentioned function $\Psi_-$ in the following way.

$\Psi_-(Fq(x,y,z), D(x,y,z))$.

The blended density distribution is regarded as the new density distribution $Fq(x,y,z)$, and $Fq(x,y,z)$ thus updated is blended with the field generating primitive $c(x,y,z)$ using the above-mentioned function $\Psi_+$, thereby generating the density distribution $Gq(x,y,z)$ as shown below.

$$Gq(x,y,z)=\Psi_+(Fq(x,y,z), c(x,y,z))$$

Even when the deformation of an object shape is realized in this manner, it is nothing but updating the sampling data $\Lambda q$.

In other words, the density distribution for an object after deformation is contained in the framework of density distribution capable of being processed according to the present invention, and no problem is posed in continuing further with the modeling work on the object after deformation.

DESCRIPTION OF THE PREFERRED EMBODIMENTS

A computer aided modeling technique for three-dimensional free-form objects according to an embodiment of the present invention will be described below with reference to the flowchart shown in FIG. 3. In the modeling technique according to this embodiment, n is assumed to be 2 and sets $\Xi q$ (q=1, 2, ..., n), each of which are composed of a finite number of points in a 3D space, are provided as two sets $\Xi_1$, $\Xi_2$ represented by the following equations for three positive numbers $L_x$, $L_y$, $L_z$.

$$\Xi_1 = \{(iL_x, jL_y, kL_z) \mid i=0, 1, \ldots, N_x;$$
$$j=0, 1, \ldots, N_y; k=0, 1, \ldots N_z\}$$
$$\Xi_2 = \{((i+0.5)L_x, (j+0.5)L_y,$$
$$(k+0.5)L_z) \mid i=-1, 0, \ldots, N_x;$$
$$j=-1, 0, \ldots, N_y; k=-1, 0, \ldots N_z\}$$

For simplicity's sake, explanation will be made about the case in which sets $\Xi q$ (q=1, 2, ..., n) each including a finite number of points in the 3D space are provided as two sets $\Xi_a$, $\Xi_2$ expressed by the equations below assuming the relations $L_x=L_y=L_z=1$ and $N_x=N_y=N_z=N$ in the above-mentioned two equations. The two-dimensional grid 11 shown in FIG. 4 has grid points at points associated with the set $\Xi_1$, while the two-dimensional grid 12 has grid points at points associated with the set $\Xi_2$.

$$\Xi_1 = \{(i, j, k) \mid i=0, 1, \ldots, N;$$
$$j=0, 1, \ldots, N; k=0, 1, \ldots N\}$$
$$\Xi_2 = \{(i+0.5, j+0.5, k+0.5) \mid$$
$$i=-1, 0, \ldots, N; j=-1, 0, \ldots, N;$$
$$k=-1, 0, \ldots N\}$$

Also, explanation will be made about the case in which up to the first-order (m=1) of partial derivatives of the density distribution $Gq(x,y,z)$ are sampled at points included in the above-mentioned two sets $\Xi q$ (q=1, 2) so that the sampling data $\Lambda q$ is expressed by the following equation.

$$\Lambda_q = \{\mu_p (i,j,k) = \partial^{i+j+k} G_q (x_p, y_p, z_p) /$$
$$\partial x^i \partial y^j \partial z^k \mid i+j+k=0, 1, i \geq 0, j \geq 0, k \geq 0.$$
$$\text{All points } P = (Xp, Yp, Zp) \text{ included in } \Xi q\}$$

Further, in the explanation, the density value a for defining the surface of object is assumed to be 0.5.

Figure 1A:
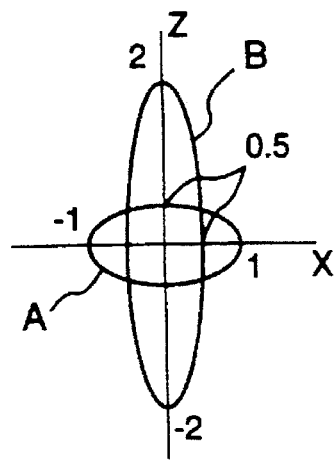
FIGS. 1A to 1D are schematic diagrams illustrating the problem points of the prior art.
Figure 1B:
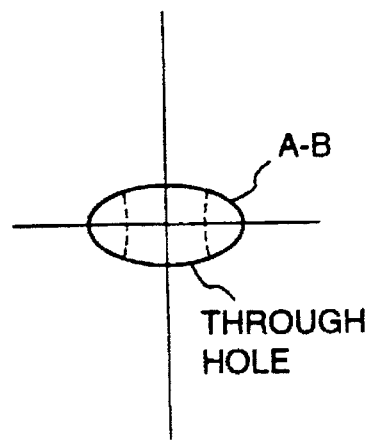
Figure 1C:
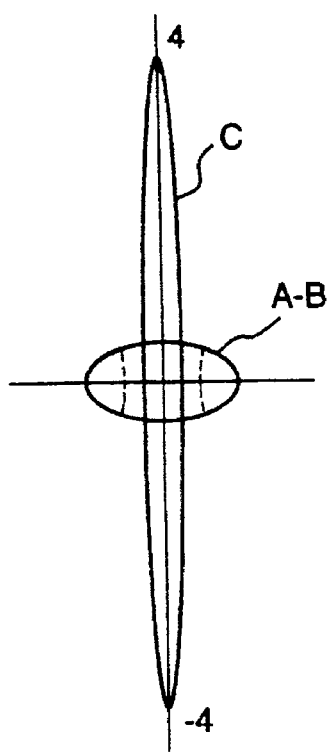
Figure 1D:
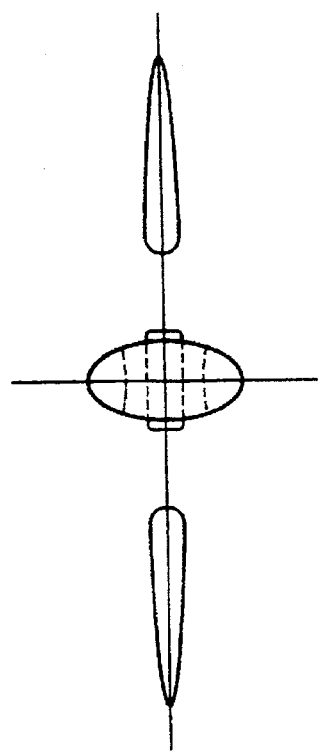
Figure 2A:
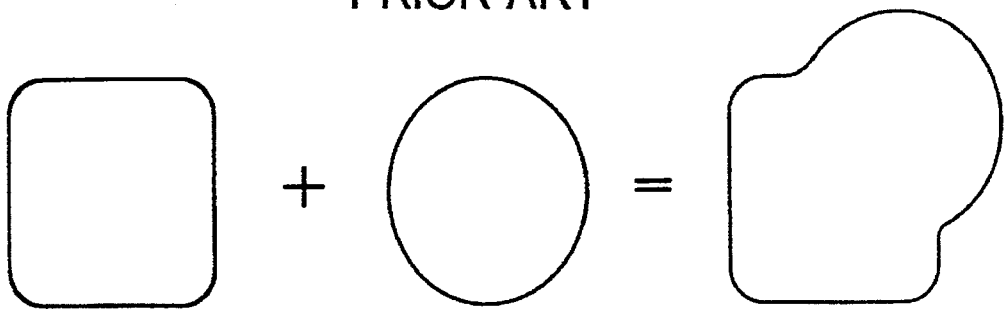
FIGS. 2A to 2C are diagrams showing smoothed Boolean set operations as modeled in the two-dimensional world.
Figure 2B:
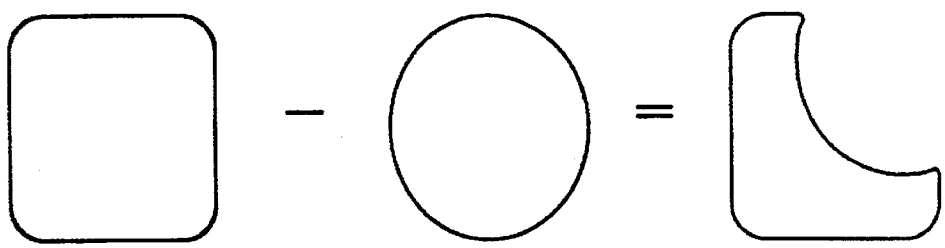
Figure 2C:
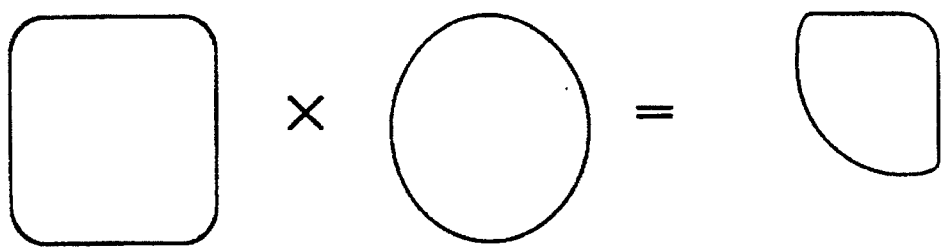
Figure 3:
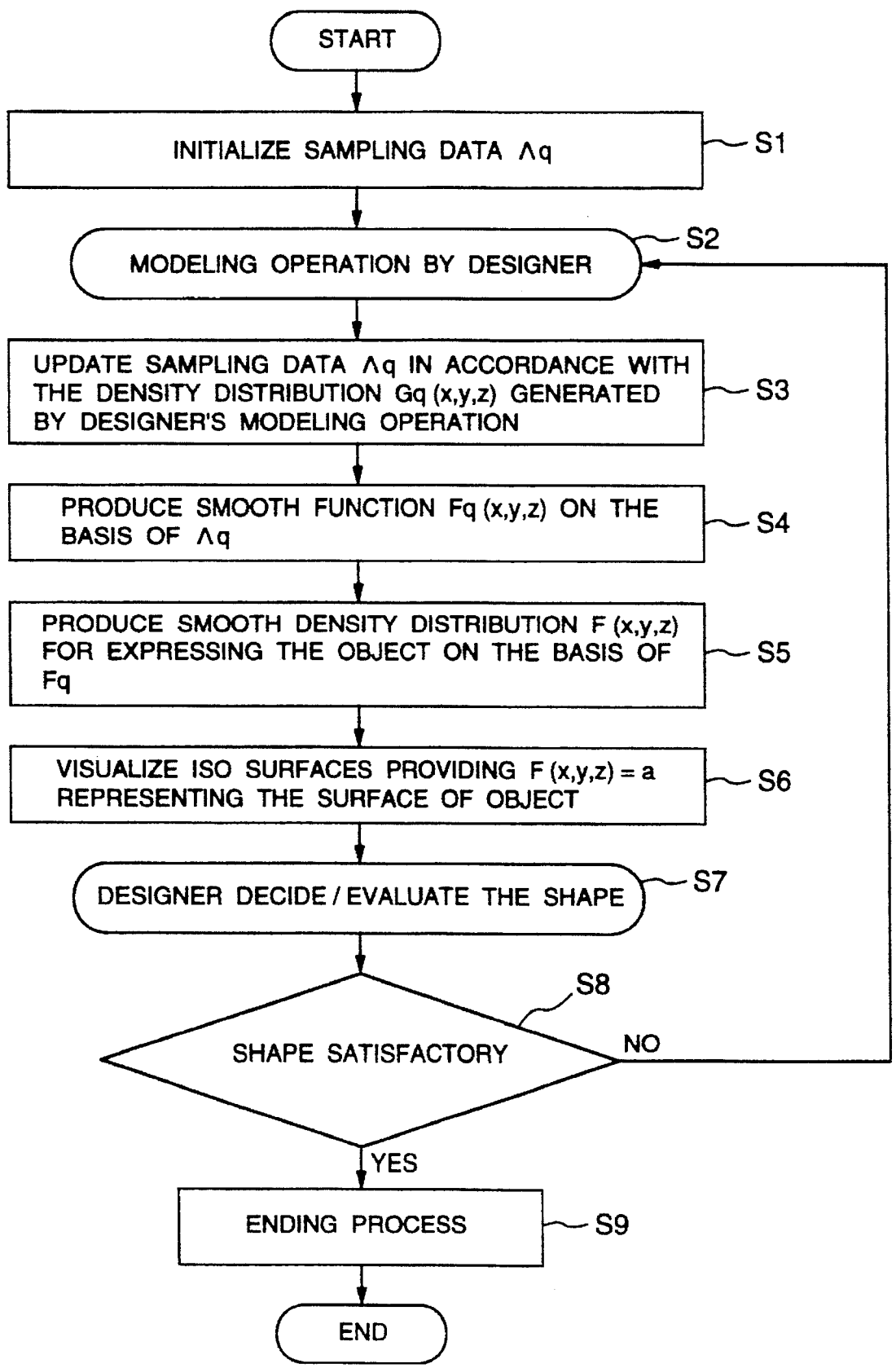
FIG. 3 is a flowchart showing the operation of a system for modeling 3D free-form objects by a method according to a first embodiment of the present invention.

According to the embodiment under consideration, as shown in FIG. 3, first, all the data $\mu p(i,j,k)$ included in the sampling data $\Lambda p$ are initialized to zero in step S1. As an alternative, the sampling data $\Lambda q$ are initialized by loading a sampling data $\Lambda q$ providing the result of the past modeling.

Next, the modeling operation by the designer is performed in step S2, followed by step S3 where the sampling data $\Lambda q$ is updated according to the density distribution $Gq(x,y,z)$ generated by the designer's modeling operation. Then, smooth density distribution $Fq(x,y,z)$ is produced on the basis of the sampling data $\Lambda q$ in step S4. In step S5, smooth density distribution $F(x,y,z)$ representing the object is produced on the basis of the density distribution $Fq$ produced in step S4.

Then, in step S6, the operation for visualizing the isosurfaces represented by the relation $F(x,y,z)=a$ providing the surface of object is performed. In step S7 a geometric decision and evaluation are performed by the designer. Step S8 decides whether the shape is satisfactory or not, and if satisfactory, the process proceeds to Step S9 for performing the final operation. In the case where the decision in step S8 is not satisfactory, on the other hand, the process returns to Step S2 where the above-mentioned steps are repeated.

A method of modeling operation by the designer in step S2 will be explained. The modeling operation by the designer is of the following three types:

(a) Operation using field generating primitives (b) Operation for deforming an object existing in a designated spatial region by deforming the particular region (c) Operation by sweep or mirror copy of density First, the modeling operation (a) above will be explained. According to this embodiment, a function f ($\xi$) expressed by the following three equations is used as a smooth monotone increasing function satisfying the equations $0 \leq \phi(\xi) \leq 1$ and $\phi(0.5)=0.5$.

$$\phi(\xi) = 0 \qquad (\xi \leq 0)$$
$$\phi(\xi) = B_3^5(\xi) + B_4^5(\xi) + B_5^5(\xi) \qquad (0 < \xi < 1)$$
$$\phi(\xi) = 1 \qquad (1 \leq \xi)$$

where the function $B^5_i(\xi)$ is a fifth-order Bernstein polynomial term which can be expressed by the equation below.

$$B^5_i(\xi) = [5!/\{i!(5-i)!\}]\xi^i(1-\xi)^{5-i} (i=0, 1, 2, 3, 4, 5)$$

Figure 5:
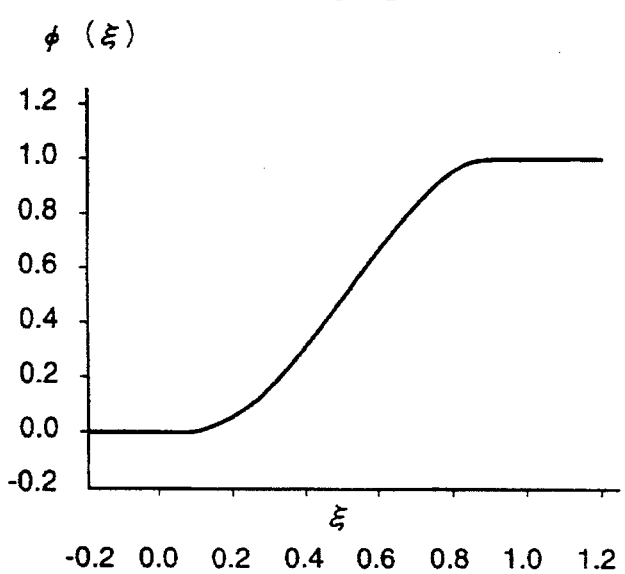
FIG. 5 is a diagram showing a graph of the function $\phi(\xi)$ used in a method according to an embodiment of the present invention.

This function $\phi(\xi)$, as shown in FIG. 5, is a smooth function of class $C^2$ continuous up to the second-order derivative. Further, according to this embodiment, a function $P_R(\xi)$ of class $C^2$ expressed by the following equation is defined.

$$P_R(\xi) = \phi(0.5-(0.5 \xi/R)) \quad (R>0).$$

According to the embodiment under consideration, various field generating primitives can be configured. The density distribution of a typical field generating primitive is described in a function form which is described with a local coordinate system x'–y'–z' specific to the primitive.

The density distribution $c'(x',y',z')$ of an ellipsoid primitive, for example, can be described in a function form expressed by the following equation having positive parameters k, a, b, c adjustable by the designer.

$$c'(x',y',z') = \phi(0.5-k\{(x'/a)^2+(y'/b)^2+(z'/c)^2-1\})$$

Also, the density distribution $c'(x',y',z')$ of a convex n-sided polyhedron primitive with faces i (i=1, 2, ..., n) passing a point $P_i'$ and having an outer unit normal vector $n_i'$ is defined in a function form expressed by the following equation having a positive parameter R adjustable by the designer using the inner product $(X'-P_i', n_i')$ of the vector $X'-P_i'$ and the unit normal vector $n_i'$ with respect to a point $X'(x',y',z')$.

$$c'(x',y',z') = \prod_{i=1}^{n} p_R((\chi' - P_i', n_i'))$$

As the last example of a field generating primitive, the density distribution $c'(x',y',z')$ of an ellipsoid cylinder primitive is described in a function form expressed by the following equation having positive parameters k, a, b, R adjustable by the designer.

$$c'(x',y',z') = \phi(0.5 - k\{(x'/a)^2 + (y'/b)^2 - 1\}) \cdot$$
$$p_R((\chi' - p_1', n_1') \cdot p_R((\chi' - p_2', n_2'))$$

The faces 1 and 2 are ones defining the top and bottom sides of the ellipsoid cylinder primitive.

The designer generates density distribution $c(x,y,z)$ by arranging the above-mentioned field generating primitive in the desired orientation and at the desired position in the space x-y-z with the adjustable parameters set to the desired value, and performs various blends $\Psi(Fq(x,y,z), c(x,y,z))$ in such a manner as to produce the sum or difference or a portion shared with the density distribution $Fq(x,y,z)$ already existing in the space, thereby producing density distribution $Gq(x,y,z)$.

$$G_q(x,y,z) = \Psi(F_q(x,y,z), c(x,y,z))$$

where the blend $\Psi$ uses the following three types of functions:

Sum: $\Psi_+(\xi, \zeta) = \xi + \zeta - \xi\zeta$

Difference: $\Psi_-(\xi, \zeta) = \xi - \xi\zeta$

Common portion: $\Psi_*(\xi, \zeta) = \xi\zeta$

Next, explanation will be made about the modeling operation described in (b) above (that is, the operation for deforming an object existing in a designated spatial region by deforming the particular spatial region). In this modeling operation, a function $c(x,y,z)$ is defined as follows using a function d associated with a smooth bigection (one-to-one onto-mapping) d: $R_1 \rightarrow R_2$ from region $R_1$ to region $R_2$ and a smooth inverse mapping $d^{-1}$: $R_2 \rightarrow R_1$ in the 3D space where the region $R_1$ is a spatial region to be deformed.

$c(x,y,z) = F(d^{-1}(x,y,z))$ (points (x,y,z) included in the region $R_2$)

$c(x,y,z) = 0$ (points (x,y,z) not included in the region $R_2$)

The above-mentioned function $c(x,y,z)$ is regarded as a density function of the field generating primitive noted above. The density distribution $D(x,y,z)$ of the field generating primitive approximating the region $R_1$ in surface shape is blended with the density distribution $Fq(x,y,z)$ already existing in the space using the above-mentioned function $\Psi$—in such a manner as $\Psi$—$(Fq(x,y,z), D(x,y,z))$. The density distribution thus blended is assumed to be new density distribution $Fq(x,y,z)$. The density distribution $Fq(x,y,z)$ thus updated and the field generating primitive $c(x,y,z)$ are blended into $Gq(x,y,z) = \Psi_+(Fq(x,y,z), c(x,y,z))$ using the above-mentioned function $\Psi_+$. In this way, the density function $Gq(x,y,z)$ is generated to deform the object shape.

The mapping d described above includes a variety of transformations such as affine transformation, twisting and bending. In the case where the region $R_1 = [-a,a] \times [-b,b] \times [-c,c]$ is twisted about the z-axis in counterclockwise direction by $\theta$ radians, for example, the function $d(x,y,z)$ expressed by the following equation provides the mapping d.

$$d(x,y,z) = (x \cdot \cos\theta_z - y \cdot \sin\theta_z, y \cdot \cos\theta_z + x \cdot \sin\theta_z, z)$$

where the angle $\theta_z$ is determined by the equation $$\theta_z = \theta(z+c)/(2c)$$

What should be noted in implementing this method is that the density distribution $c(x,y,z)$ is generally discontinuous on the boundary of the region $R_1$.

According to this method, the density distribution $Fq(x,y,z)$ and the field generating primitive $c(x,y,z)$ are blended as shown by the equation $Gq(x,y,z) = \Psi_+(Fq(x,y,z), c(x,y,z))$ thereby to generate the density distribution $Gq(x,y,z)$. A smooth density distribution function $Fq(x,y,z)$ is producing for interpolating a finite number of sampling data $\Lambda q$ for the generated density distribution $Gq(x,y,z)$, thereby realizing a deformation of an object shape. As a result, the discontinuity of the density distribution $c(x,y,z)$ itself is not a much practical problem as far as a region of appropriate size including the object to be deformed is selected as the region $R_1$.

Now, explanation will be made about the modeling operation of (c) (that is, the operation by sweep or mirror copy of density). This modeling operation directly modifies the sampling data $\Lambda q = \{\mu p(i,j,k) | i+j+k = 0.1 \ldots, m, i \geq 0, j \geq 0, k \geq 0\}$ by translational sweep, rotational sweep or mirror copying of the density distribution thereby to modify the density distribution $Fq(x,y,z)$, with the result that the density function $F(x,y,z)$ for expressing an object is corrected.

First, the translational sweep will be explained. Consider the case in which the density distribution $F(x,y,z)$ in the closed region $R_1$ existing on a plane passing a point $P_0$ is copied by being swept a length h in the direction of unit normal vector n of the particular plane. A cylinder-shaped closed region with a height of h and having a bottom which is the region $R_1$ that can be obtained by sweep is labelled as $R_2$.

Data $\mu_p(i,j,k)$ at a point P, which belongs to the region $R_2$ and is included in two sets $\Xi_1, \Xi_2$ expressed by the following equations respectively, are determined in the manner described below.

$\Xi_1 = \{(i, j, k) | i = 0, 1, \ldots, N;$
$j = 0, 1, \ldots, N; k = 0, 1, \ldots, N\}$
$\Xi_2 = \{(i + 0.5, j + 0.5, k + 0.5) |$
$i = -1, 0, \ldots, N; j = -1, 0, \ldots, N;$
$k = -1, 0, \ldots, N\}$ First, which point $Q = (x_q, y_q, z_q)$ on the region $R_1$ is associated with the point P is determined by the equation $$Q = P - (P - P_0, n)n$$

The data $\mu_p(i,j,k)$ is then determined as shown by the three equations below.

$\mu_p(0,0,0) = F(x_q, y_q, z_q)$
grad $F(x_q, y_q, z_q) = (\partial F(x_q, y_q, z_q)/\partial x, \partial F(x_q, y_q, z_q)/\partial y, \partial F(x_q, y_q, z_q)/\partial z)$
$(\mu_p(1,0,0), \mu_p(0,1,0), \mu_p(0,0,1)) =$
grad $F(x_q, y_q, z_q) - ($grad $F(x_q, y_q, z_q), n)n$ Finally, the following processing is performed for a point P, which is included in a cylindrical region obtained by extending the region $R_2$ above the top of the cylindrical region $R_2$, of all the points included in the set $\Xi_1$ or $\Xi_2$.

First, which point $Q = (x_q, y_q, z_q)$ before sweep is associated with the point P is determined by the following equation.

$$Q = P - hn$$

Then, the data $\mu_p(i,j,k)$ is determined in the manner shown by the three equations below.

$$\mu_p(0,0,0) = F(x_q, y_q, z_q)$$
$$\text{grad } F(x_q, y_q, z_q) = (\partial F(x_q, y_q, z_q)/\partial x,$$
$$\partial F(x_q, y_q, z_q)/\partial y, \partial F(x_q, y_q, z_q)/\partial z)$$
$$(\mu_p(1,0,0), \mu_p(0,1,0), \mu_p(0,0,1)) =$$
$$\text{grad } F(x_q, y_q, z_q)$$

Now, the rotational sweep will be explained. Consider the case in which the density existing in a half-plane $[0,\infty)\times[0,0]\times(-\infty,\infty)$ in the density distribution $F(x,y,z)$ is rotationally swept about the z-axis.

With regard to the point $P=(x_p, y_p, z_p)$ included in the sets $\Xi q$ (q=1, 2), the values r and $g_s$ are determined from the following two equations respectively.

$$r=(x_p^2+y_p^2)^{1/2}$$
$$g_s=(1/r)\partial F(r,0,z_p)/\partial x$$

The data $\mu_p(i,j,k)$ is determined in the manner shown by the following four equations using the two values r and $g_s$ thus determined.

$$\mu_p(0,0,0)=F(r, 0, z_p)$$
$$\mu_p(1,0,0)=g_s\cdot x_p$$
$$\mu_p(0,1,0)=g_s\cdot x_p$$
$$\mu_p(0,0,1)=\partial F(r, 0, z_p)/\partial z$$

Now, the mirror copying will be explained. Consider the case where the density existing in the half-space $S^+=[0,\infty)\times(-\infty,\infty)\times(-\infty,\infty)$ in the density distribution $F(x,y,z)$ is mirror-copied to the half-space $S^-$ on the other side. For a point $P=(x_p, y_p, z_p)$ included in the set $\Xi q$ (q=1, 2) and belonging to the half-space $S^-$, the data $\mu_p(i,j,k)$ is determined in the manner as shown by the following four equations assuming that a mirror imaging point in the y-z plane of the point P belonging to the half-space $S^-$ is given by a point $Q=(-x_p, y_p, z_p)$.

$$\mu_p(0,0,0)=\mu_Q(0,0,0)$$
$$\mu_p(1,0,0)=-\mu_Q(1,0,0)$$
$$\mu_p(0,1,0)=\mu_Q(0,1,0)$$
$$\mu_p(0,0,1)=\mu_Q(0,0,1)$$

Also, the data $\mu_p(i,j,k)$ for the point $P=(0,y_p,z_p)$ existing in the y-z plane and included in the set $\Xi_q$(q=1, 2) is determined in such a manner that part from $\mu_p(1,0,0)=0$, the data $\mu_p(0,0,0)$, $\mu_p(0,1,0)$ and $\mu_p(0,0,1)$ are not corrected.

In the modeling operations (a) and (b) except for the modeling operation (c) described above, the sampling data $\Lambda q$ expressed by the following equation is updated using the function of step S3 in FIG. 3 whereby the sampling data $\Lambda q$ is updated in accordance with the density distribution $Gq(x,y,z)$ generated by the modeling operation of the designer.

$$\Lambda_q = \{\mu_p(i,j,k) = \partial^{i+j+k} G_q(x_p, y_p, z_p)/\partial x^i \partial y^j \partial z^k \mid i+j+k = 0, 1, i \geq 0, j \geq 0,$$
$$k \geq 0; \text{all points } P = (x_p, y_p, z_p)$$
$$\text{included in the set } \Xi_q\})$$

The blend $\Psi+$, for example, is dealt with as follows.

$$\partial(F+c-Fc)/\partial x=\partial F/\partial x+\partial c/\partial x-(\partial F/\partial x)c-F(\partial c/\partial x)$$

The blend $\Psi+$ is expressed by the following equation.

$$\Psi+(F_q(x,y,z), c(x,y,z))=F_q(x,y,z)+c(x,y,z)-F_q(x,y,z)c(x,y,z)$$

The data $\mu_p(i,j,k)$ only for the point $P=(x_p, y_p, z_p)$ belonging to a region not zero in the density distribution $c(x,y,z)$ of all points included in the set $\Xi q$ is updated according to the following five equations.

$$g_0 = \mu_p(0,0,0)$$
$$\mu_p(0,0,0) = g_0 + c(x_p, y_p, z_p) - g_0 c(x_p, y_p, z_p)$$
$$\mu_p(1,0,0) = \mu_p(1,0,0) + \partial c(x_p, y_p, z_p)/\partial x - \mu_p(1,0,0) c(x_p, y_p, z_p) - g_0 \partial c(x_p, y_p, z_p)/\partial x$$
$$\mu_p(0,1,0) = \mu_p(0,1,0) + \partial c(x_p, y_p, z_p)/\partial y - \mu_p(0,1,0) c(x_p, y_p, z_p) - g_0 \partial c(x_p, y_p, z_p)/\partial y$$
$$\mu_p(0,0,1) = \mu_p(0,0,1) + \partial c(x_p, y_p, z_p)/\partial z - \mu_p(0,0,1) c(x_p, y_p, z_p) - g_0 \partial c(x_p, y_p, z_p)/\partial z$$

The formulae for updating the data $\mu_p(i,j,k)$ for other blends can also be introduced in a similar manner.

A smooth function $Fq(x,y,z)$ for interpolating the sampling data $\Lambda q$ is produced in the following manner using the function of step S4 in FIG. 3 for producing the smooth function $Fq(x,y,z)$ on the basis of the sampling data $\Lambda q$.

First, a method for producing a function $F_1(x,y,z)$ will be explained. A region $[I,I+1]\times[J,J+1]\times[K,K+1]$ (where I, J, K=0, 1, ..., N-1) in the 3D space x-y-z is assumed to be a region $\{(s,t,u) | 0 \leq s \leq 1, 0 \leq t \leq 1, 0 \leq u \leq 1\}$, and a function $f_{I,J,K}(s,t,u)$ is defined by the equation below.

$$F_{I,J,K}(s,t,u) = \sum_{i=0}^{3}\sum_{j=0}^{3}\sum_{k=0}^{3} W_{I,J,K}(i,j,k)B_i^3(s)B_j^3(t)B_k^3(u)$$

where $$B_i^3(\xi) = [3!/\{i!(3-i)!\}] \xi^i (1-\xi)^{3-i}$$
$$(i = 0, 1, 2, 3)$$

$$B_j^3(\xi) = [3!/\{j!(3-j)!\}] \xi^j (1-\xi)^{3-j}$$
$$(j = 0, 1, 2, 3)$$

$$B_k^3(\xi) = [3!/\{k!(3-k)!\}] \xi^k (1-\xi)^{3-k}$$
$$(k = 0, 1, 2, 3)$$

The scalar quantity $W_{I,J,K}(i,j,k)$ is a weight arranged at point $(I+(i/3),J+(j/3),K+(k/3))$ in the 3D space x-y-z. Using the function $f_{I,J,K}$ defined piecewise in this way, the structure of the function $F_1(x,y,z)$ is specified in the manner shown by the following equation.

$$F_1(I+s, J+t, K+u)=f_{I,J,K}(s,t,u)(I, J, K=0, 1, \ldots, N-1; 0 \leq s, t, i \leq 1)$$

Then, the weight $W_{I,J,K}(i,j,k)$ is determined in such a manner that the function $F_1$ interpolates the sampling data $\Lambda_1=\{\mu_p(i,j,k)=\partial^{i+j+k}G_1(x_p, y_p, z_p)/\partial x^i \partial y^j \partial z^k | i+j+k=0,1, i\geq 0, j\geq 0, k\geq 0;$ all the points $P=(x_p, y_p, z_p)$ included in the set $\Xi_1\}$ and is continuous up to the first-order partial derivative.

Specifically, the weight arranged at point $(I+(i/3),J+(j/3),K+(k/3))$ is expressed anew as $<i,j,k>_{I,J,K}(i,j,k=-1,0,1)$ and the weight is determined about $P=(I,J,K)$ in the following manner.

$$<i,j,k>_{I,J,K} = \mu_p(0,0,0) + (1/3)$$
$$\{i\mu p(1,0,0) + j\mu p(0,1,0) + k\mu p(0,0,1)\}$$
$$(i,j,k = -1,0,1)$$

A method for producing a function $F_2(x,y,z)$ is explained. A region $[I+0.5, I+1.5] \times [J+0.5, J+1.5] \times [K+0.5, K+1.5]$ (wherein $I, J, K=-1, 0, 1, \ldots, N-1$) is regarded as a region $\{(s,t,u)|0 \leq s \leq 1, 0 \leq t \leq 1, 0 \leq u \leq 1\}$, and the function $f_{I,J,K}(s,t,u)$ is defined by the following equation.

$$F_{I,J,K}(s,t,u) = \sum_{i=0}^{3}\sum_{j=0}^{3}\sum_{k=0}^{3} W_{I,J,K}(i,j,k)B_i^3(s)B_j^3(t)B_k^3(u)$$

where;

$$B_i^3(\xi) = [3!/\{i!(3-i)!\}] \xi^i (1-\xi)^{3-i}$$
$$(i = 0, 1, 2, 3)$$

$$B_j^3(\xi) = [3!/\{j!(3-j)!\}] \xi^j (1-\xi)^{3-j}$$
$$(j = 0, 1, 2, 3)$$

$$B_k^3(\xi) = [3!/\{k!(3-k)!\}] \xi^k (1-\xi)^{3-k}$$
$$(k = 0, 1, 2, 3)$$

The scalar quantity $w_{I,J,K}(i,j,k)$ is a weight arranged at point $(I+0.5+(i/3), J+0.5+(j/3), K+0.5+(k/3))$ in the 3-D space x-y-z. The function $f_{I,J,K}$ defined piecewise in this way is used to specify the structure of the function $F_2(x,y,z)$ according to the following equation.

$$F_2(I + 0.5 + s, J + 0.5 + t, K + 0.5 + u) = f_{I,J,K}(s,t,u)$$
$$(I,J,K = -1, 0, 1, \ldots, N-1: 0 \leq s,t,u \leq 1)$$

As the next step, the weight $W_{I,J,K}(i,j,k)$ is determined is such a manner that the function $F_2$ interpolates the sampling data $\Lambda_2 = \{\mu p(i,j,k) = \partial^{i+j+k} G_2(x_p, y_p, z_p)/\partial x^i \partial y^j \partial z^k | i+j+k=0,1, i \geq 0, j \geq 0, k \geq 0$; all the points $P=(x_p, y_p, z_p)$ included in the set $\Xi_2\}$, and is continuous up to the first-order partial derivative.

Specifically, the weight arranged at point $(I+0.5+(i/3), J+0.5+(j/3), K+0.5+(k/3))$ is expressed anew as $<i,j,k>_{I,J,K}(i,j, k=-1,0,1)$ and the weight determined in the manner as expressed by the following equation about the point $P=(I+0.5, J+0.5, K+0.5)$.

$$<i,j,k>_{I,J,K} = \mu p (0,0,0) + (1/3)$$
$$\{i\mu p (1,0,0) + j\mu p (0,1,0) + k\mu p (0,0,1)\}$$
$$(i,j,k = -1,0,1)$$

After that, the density distribution $F(x,y,z)$ for expressing an object is produced from the following equation using the function of step S5 in FIG. 3 for producing the smooth density distribution $F(x,y,z)$ representing an object based on the function Fq.

$$F(x,y,z) = \{F_1(x,y,z) + F_2(x,y,z)\}/2$$

This production method concerns the case involving the setting of $\lambda_1(x,y,z) \equiv \frac{1}{2}$, $\lambda_2(x,y,z) \equiv \frac{1}{2}$ in a convex combination $\lambda_1(x,y,z)F_1(x,y,z) + \lambda_2(x,y,z)F_2(x,y,z)$ of the functions $F_1, F_2$.

This method is normally used for generating each function in such a manner that functions defined piecewise for each cubic region are smoothly connected on the boundary surface of each region thereby to generate the smooth function $F(x,y,z)$ in the total space. In this method, an undesirable minor unevenness may occur on isosurfaces satisfying the density distribution $F(x,y,z)=0.5$ providing the surface of object.

This unevenness of course can be avoided by increasing the number of sampling points, i.e., by reducing the cubic region for which each function is defined. For this to be realized, however, main memory of the computer is consumed in large quantities and may become unable to store the required data.

In such a case, the OS (operating system) of the computer automatically performs the swapping operation to have a hard disk share the burden of accommodating the shortage of storage in main memory. In this condition of swapping operation, the system response is extremely reduced as the access rate to the hard disk is very low as compared with the access rate to main memory.

As a consequence, in the method using the piecewise function generation mentioned above, it is important to generate better shapes of the surface of object using data at a smaller number of sampling points.

The reason for using two types of point sets $\Xi_1, \Xi_2$ according to this embodiment is that the density distribution $F(x,y,z)$ produced according to the embodiment provides a better shape of the isosurface with the density distribution $F(x,y,z)=0.5$ providing the surface of object (that is, the embodiment reduces the undesirable unevennesses) as compared with the density distribution $F(x,y,z)$ produced using only a single point set $\Xi_1 = \{(i(N/N'), j(N/N'), k(N/N'))|i=0,1, \ldots, N'; j=0,1,\ldots,N'; k=0,1, \ldots, N'\}$ (i.e., $(N'+1)^3$ to $2(N+1)^3$) including substantially the same number of points as $(N+1)^3 + (N+2)^3$ to $2(N+1)^3$ included in the sum of the two point sets $\Xi_1$ and $\Xi_2$.

Figure 4:
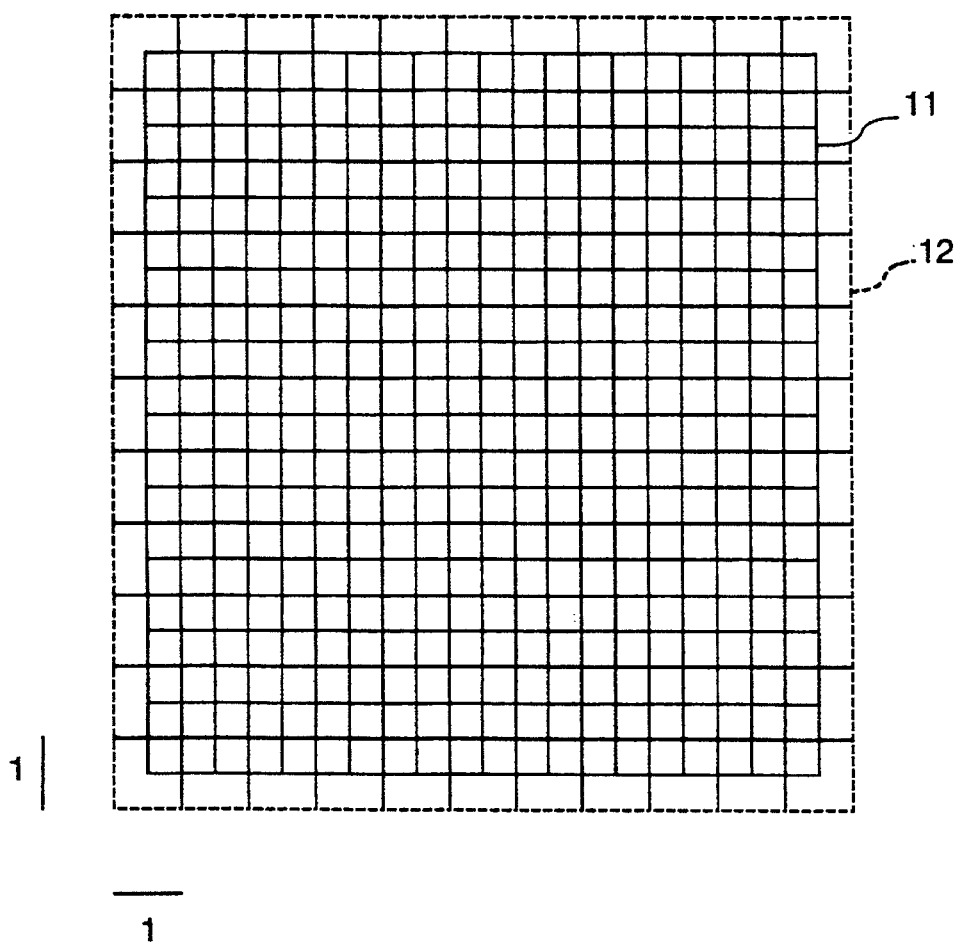
FIG. 4 is a diagram showing the relation between a set $\Xi_1$ and a set $\Xi_2$ of sampling points as modeled in the two-dimensional world.

This is by reason of the fact that as shown in FIG. 4, the two types of point sets $\Xi_1$ and $\Xi_2$ are displaced by (0.5, 0.5, 0.5) and therefore the sampling points of one set are located at the center of gravity of each cubic region producing the function $f_{I,J,K}(s,t,u)$. The center of gravity of each cubic region is a point where the interpolation accuracy of the interpolation function $f_{I,J,K}(s,t,u)$ is most likely to be worst. Such a center of gravity, however, is a sampling point itself, and therefore is accurately interpolated up to the first-order partial derivative. In FIG. 4, numeral 11 designates a two-dimensional grid configured of points belonging to the set $\Xi_1$ as grid points, and numeral 12 a two-dimensional grid composed of points belonging to the set $\Xi_2$ as grid points.

With the function $F(x,y,z)$ produced as an average of the respective interpolation functions, therefore, a density distribution is realized securing a substantially uniform spatial interpolation accuracy, thereby suppressing the undesirable unevennesses of isosurfaces absent in the original density distribution providing an object of interpolation.

As a result, a shape of an object with the undesirable unevennesses effectively suppressed can be produced from a smaller number of sampling data, thereby effectively reducing the consumption of main memory.

Also, apart from the method of convex combination $\lambda_1(x,y,z)F_1(x,y,z) + \lambda_2(x,y,z)F_2(x,y,z)$ of the functions $F_1, F_2$ where $\lambda_1 \equiv \frac{1}{2}$, $\lambda_2 \equiv \frac{1}{2}$ described above, the following convex combination is also useful.

First, a smooth function $\Omega(x)$ is defined.

$$\Omega(l+s) = 2^4 s^2 (1-s)^2,$$

$$l=0, 1, 2, \ldots; 0 \leq s \leq 1$$

Then, a smooth function $\Omega(x,y,z)$ is defined in the 3D space x-y-z.

$$\Omega(x,y,z) = \{\Omega(x) + \Omega(y) + \Omega(z)\}/3$$

Using this function, $\lambda_1, \lambda_2$ in the convex combination are defined as $$\lambda_1(x,y,z) = 1 - \tilde{\Omega}(x,y,z)$$

$$\lambda_2(x,y,z) = \tilde{\Omega}(x,y,z)$$

and the density distribution F(x,y,z) for expressing an object is produced according to the following equation.

$$F(x,y,z) = \lambda_1(x,y,z) F_1(x,y,z) + \lambda_2(x,y,z) F_2(x,y,z)$$

The feature of this production method is that the density distribution F(x,y,z) interpolates the sampling data $\Lambda_1$ on the set $\Xi_1$ and the sampling data $\Lambda_2$ on the set $\Xi_2$. Further, the functions $F_1$, $F_2$ are properly blended at other points. For example, at points (I+0.5,J+0.5,K) (I,J,K=0,1,2, . . . . )

$$\begin{aligned}
\tilde{\Omega}(I+0.5, J+0.5, k) &= \{\Omega(I+0.5) + \Omega(J+0.5) + \Omega(k)\}/3 \\
&= \{2^4 \cdot 0.5^2 \cdot (1-0.5)^2 + 2^4 \cdot 0.5^2 \cdot \\
&\quad (1-0.5)^2 + 2^4 \cdot 0^2 \cdot (1-0)^2\}/3 \\
&= 2/3
\end{aligned}$$

and therefore, $$F(I+0.5, J+0.5, K) =$$

$$\frac{1}{3} F_1(I+0.5, J+0.5, K) + \frac{2}{3} F_2(I+0.5, J+0.5, K)$$

As a result, the point (I+0.5,J+0.5,K) is nearer to the point (I+0.5,J+0.5,K+0.5) included in the set $\Xi_2$ than to the point (I,J,K) included in the set $\Xi_1$. Therefore, this blend is proper and reflects the fact that the value of the density distribution F(I+0.5,J+0.5,K) at the point (I+0.5,J+0.5,K) is affected stronger by the function $F_2$ than by the function $F_1$.

With the density distribution F(x,y,z) thus generated, the function of step S6 in FIG. 3 for visualizing the isosurfaces provided by the density distribution F(x,y,z)=a representing the surface of object is used thereby to visualize the shape of an object. According to the embodiment under consideration, the value F(i/V,j/V,k/V) of the density distribution F(x,y,z) on the grid point (i/V,j/V,k/V) (i,j,k=0,1, . . . , NV) is determined for an integer V (which is normally 2, 3 or 4 appropriately selected). These data are considered as volume data. The normal isosurface visualization algorithm is used for the volume data to approximately express isosurfaces represented by the density distribution F(x,y,z)=0.5 by an assembly of polygons.

The normal vector at each vertex of each polygon reflects a gradient vector for the particular vertex ($\partial$F(i/V,j/V,k/V)/$\partial$x, $\partial$F(i/V,j/V,k/V)/$\partial$y, $\partial$F(i/V,j/V,k/V)$\partial$/z) with the sign inverted and normalized to length 1. The Gouraud shading is implemented on the basis of these information, thereby making it possible to realize smooth visualization of the shape of a 3D object.

Further, there is a method in which in order to display the isosurfaces with a density distribution of 0.5 accurately, the intersection point between the line of sight projected from each pixel of the screen and the isosurface is accurately calculated thereby to determine the brightness of each intersection point. In the conventional method, however, the density distribution of an object is composed of the simple sum of a plurality of positive and negative field generating primitives. The conventional method, therefore, lacks a useful analytic property usable for calculation of intersection points and uses a heuristic algorithm for intersection point calculation, often with the result that the right intersection points cannot inherently be determined.

The density distribution F(x,y,z)={$F_1$(x,y,z)+$F_2$(x,y,z)}/2 produced according to the present embodiment, in contrast, can be expressed by the tensor product of the Bernstein polynomial terms defined piecewise on a 3D grid {(i/2,j/2, k/2)|i,j,k=0,1, . . . . . , 2N}. In other words, the density distribution F(x,y,z) can be expressed by the following equation for each cubic region [i/2,(i+1)/2]×[j/2,(j+1)/2]×[k/2,(k+1)/2].

$$F(x,y,z) = \sum_{i=0}^{3} \sum_{j=0}^{3} \sum_{k=0}^{3} W_{I,J,K}(i,j,k) \, B_i^3(s) \, B_j^3(s) \, B_k^3(u)$$

where
s=2x−i
t=2y−j
u=2z−k

As a result, an algorithm is available which can determine accurately and numerically stably the innersection points between the line of sight and isosurfaces using the properties of the Berstein polynomial terms. (Alyn Rockwood.: Accurate display of tensor product isosurfaces. In Proceedings of the First IEEE Conference on Visualization: Visualization '90. pp. 353–360. IEEE Computer Society Press, 1990). Thus no problem is posed for strict visualization of isosurfaces.

The designer observes and checks the shape of an object visualized in this way. If the shape is not satisfactory, the process is returned to step S2 of modeling operation to continue the modeling operation by the designer. When the shape is satisfactory, on the other hand, termination step S9 saves the sampling data $\Lambda q = \{\mu_p(i,j,k)|i+j+k=0,1, i \geq 0, j \geq 0, k \geq 0;$ all the points P included in the set $\Xi_q\}$(q=1, 2) in order to preserve the density distribution for expressing the object and terminates the modeling operation.

Figure 6:
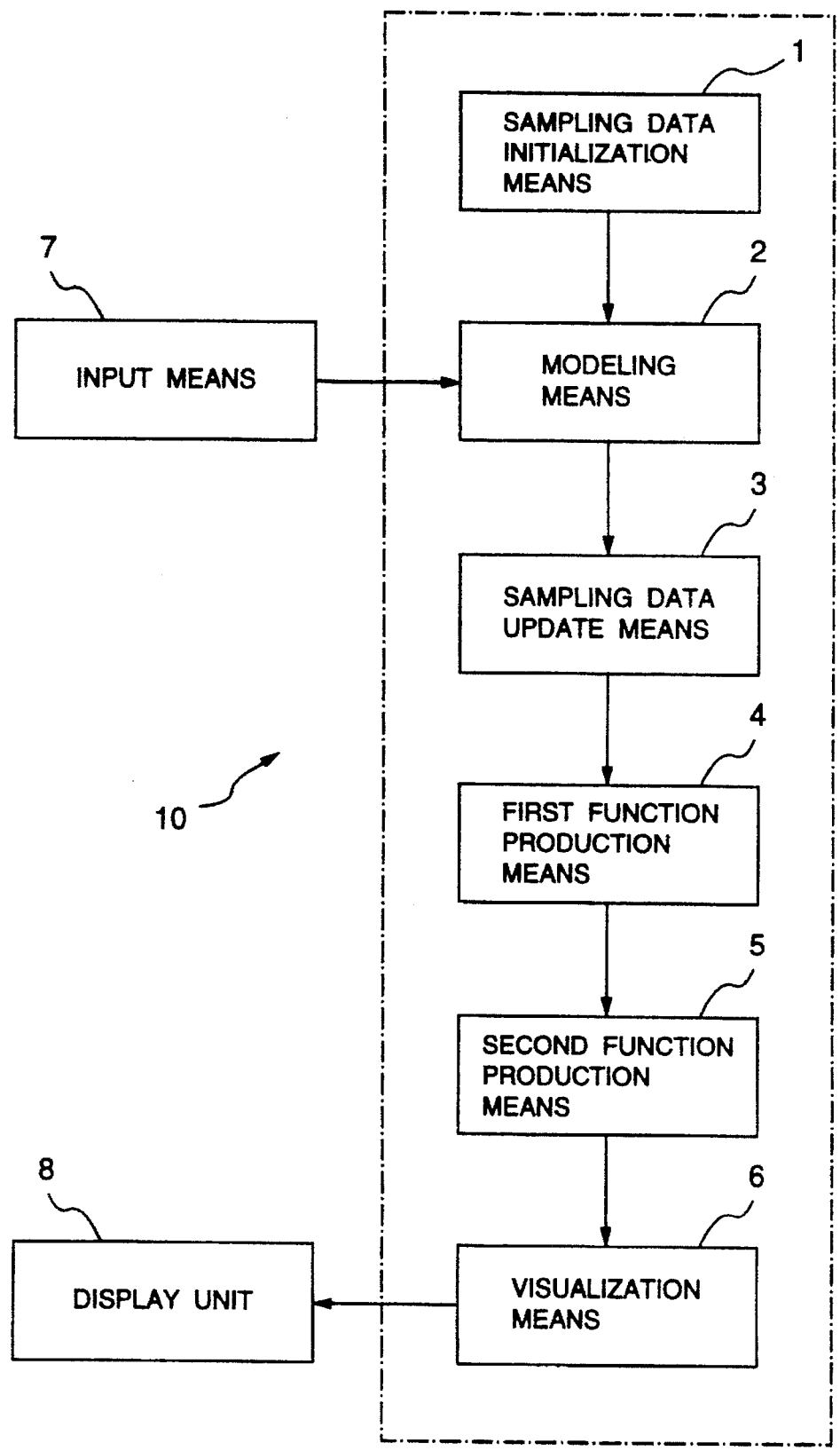
FIG. 6 is a diagram showing a configuration of an apparatus according to an embodiment of the present invention.

FIG. 6 is a diagram showing an example configuration of an apparatus for embodying the computer aided modeling technique for three dimensional free-form objects according to the present invention. As shown in FIG. 6, a modeling apparatus 10 comprises sampling data initialization means 1 for computing sampling data $\Lambda q$, modeling means 2 for generating density distribution by blending density distribution C and density distribution Fq, updating means including sampling data updating means 3, first function production means 4 and second function production means 5, visualization means 6, input means 7 and a display unit 8.

The sampling data initialization means 1 has the function of initializing the sampling data $\Lambda q$. The modeling means 2 has the function of processing the sampling data on the basis of the modeling operation performed by the designer through the input means 7.

The sampling data updating means 3 has the function of updating the sampling data $\Lambda q$ in accordance with the density distribution Gq(x,y,z) generated by the modeling operation of the designer. The first function production means 4 has the function of producing a smooth function Fq(x,y,z) on the basis of the sampling data $\Lambda q$ described above.

The second function production means 5 has the function of producing smooth density distribution F(x,y,z) for expressing an object on the basis of the smooth function Fq(x,y,z) produced by the first function production means 4. The visualization means 6 has the function of visualizing the isosurfaces represented by the density distribution F(x,y,z) providing the surface of the object. The isosurfaces visualized by the visualization means 6 is displayed on the display unit 8. Thus, the designer can perform various modeling operations including (a), (b) and (c) described above by operating the input means 7 while watching the contents displayed on the display unit 8.

As described above, in the computer aided modeling technique for 3D free-form objects according to the present invention, a shape produced as a result of blending to obtain a common portion or the sum or difference between two objects automatically assumes smooth edges. Density distribution is substantially realized in which the inside of object except for the vicinity of the surface thereof has a substantially uniform density value of 1, the outside of object except for the vicinity of the surface thereof has a substantially uniform density of 0, and only the density in the vicinity of the surfaces of object undergoes a smooth change from 0 to 1. As a result, the designer can proceed with the modeling operation concentrating on the shape of an object without paying attention to the density distribution in total space or the edge rounding.

Also, the operation of deforming an object by twisting or bending it or other deforming operations can be freely utilized. Further, an object can be modeled with a fewer number of modeling procedures by the operation of extending partially-modeled density distribution over the whole space using such various operations as sweep and mirror copying. The sensitivity of the designer thus can be input straightforward into the computer thereby providing an efficient modeling work environment to the designer.

I claim:

1. A method of modeling on a computer a three-dimensional free-form object, comprising the steps of:

defining a $F(x,y,z)$ density function in a three-dimensional space;

determining a scalar value a such that for a set of x,y,z points a surface of said object is represented by $F(x,y,z)=a$, a space inside said object is represented by $F(x,y,z)>a$, and a space outside said object is represented by $F(x,y,z)<a$;

placing on a computer screen at a desired position and with a desired orientation a field generating primitive with a $c(x,y,z)$ density function;

generating a $Gq(x,y,z)$ density function by blending said $c(x,y,z)$ density function with a $Fq(x,y,z)$ density function, wherein q is an integer and said $F(x,y,z)$ density function is comprised of a convex combination of $Fq(x,y,z)$ density functions;

sampling a partial derivative of said $Gq(x,y,z)$ density function at each point in a predetermined set of coordinate points to obtain sampling data $\Lambda q$ (where the sampling data $\Lambda q=(\mu p(i,j,k)=\{1/(i!j!k!)\}\partial^{i+j+k}G_q(x_p, y_p, z_p)/\partial x^i \partial x^j \partial z^k|i+j+k=0, 1, \ldots, m, i\geq 0, j\geq 0, k\geq 0$; all the points $P=(x_p, y_p, z_p)$ included in $\Xi q\}$) by sampling up to the mth-order partial derivative of the generated density distribution $Gq(x,y,z)$ on the points included in a set $\Xi q$ having a finite number of points in the three-dimensional space;

updating said $Fq(x,y,z)$ density function based on said sampling data;

displaying isosurfaces of said object to evaluate its shape represented by said $F(x,y,z)$ density function which is comprised of a convex combination of said updated $Fq(x,y,z)$ density functions;

altering the parameters of the $c(x,y,z)$ density function while viewing said isosurfaces; and saving the sampling dam in memory when said displayed isosurfaces are satisfactory to the user.

2. A computer aided modeling technique for three-dimensional free-form objects according to claim 1, wherein n=2, and the sets $\Xi_q$ (q=1, 2, .... n) each having a finite number of points in the three-dimensional space comprise two sets $\Xi_1$ and $\Xi_2$ expressed by the following equations with respect to three positive numbers $L_X$, $L_Y$, $L_Z$:

$\Xi_1 = \{(iL_x, jL_y, kL_z) \mid i = 0, 1, \ldots, N_x;$
$j = 0, 1, \ldots, N_y; k = 0, 1, \ldots N_z\}$
$\Xi_2 = \{((i + 0.5) L_x, (j + 0.5) L_y,$
$(k + 0.5) L_z) \mid i = -1, 0, \ldots, N_x;$
$j = -1, 0, \ldots, N_y; k = -1, 0, \ldots N_z\}$ 3. A computer aided modeling technique for three-dimensional free-form objects according to claim 1, comprising in a configuration of the field generating primitive includes the steps of:

determining the scalar quantity a which satisfies relation a>0; and determining the density distribution $c(x,y,z)$ of the field generating primitive from equation $c(x,y,z)=\phi(f(x,y,z)-b+a)$ using a smooth function $f(x,y,z)$ and a smooth monotone increasing function $\phi(\xi)$, said function $f(x,y,z)$ defining a set of points $(x,y,z)$ satisfying relation $f(x,y,z)=b$ as the surface of object, a set of points $(x,y,z)$ satisfying relation $f(x,y,z)>b$ as the inside of object and a set of points $(x,y,z)$ satisfying relation $f(x,y,z)<b$ as the outside of object, with regard to a scalar quantity b, and said monotone increasing function $\phi(\xi)$ satisfying equations $0\leq\phi(\xi)\leq 2a$ and $\phi(a)=a$.

4. A computer aided modeling technique for three-dimensional free-form objects according to claim 1, comprising the steps of:

determining the scalar quantity a satisfing relation a>0;

defining the function $c(x,y,z)$ as follows using a function d associated with a smooth bijection (one-to-one onto-mapping) $d: R_1 \rightarrow R_2$ from region $R_1$ to $R_2$ in the three-dimensional space and smooth inverse mapping $d^{-1}: R_2 \rightarrow R_1$ $c(x,y,z)=F(d^{-1}(x,y,z))$(points $(x,y,z)$ included in the region $R_2$)

$c(x,y,z)=0$(points $(x,y,z)$ not included in the region $R_2$);

regarding said function $c(x,y,z)$ as the density distribution of said field generating primitive;

updating the density distribution $Fq(x,y,z)$ as $Fq(x,y,z)-\{Fq(x,y,z)\cdot D(x,y,z)/(2a)\}$ using density distribution $D(x,y,z)$ of the field generating primitive approximating the region $R_1$ in surface shape; and blending the updated density distribution $Fq(x,y,z)$ and the field generating primitive $c(x,y,z)$ according to the following equation, thereby generating density distribution $Gq(x,y,z)$ and realizing a deformation of the object:

$$G_q(x,y,z)=F_q(x,y,z)+c(x,y,z)-\{Fq(x,y,z)\cdot c(x,y,z)/(2a)\}.$$

5. A computer aided modeling technique for three-dimensional free-form objects according to claim 1, comprising the step of modifying the sampling data $\Lambda_q=\{\mu_p(i,j,k)|i+j+k=0,1, \ldots, m, i\geq 0, j\geq 0, k\geq 0\}$ directly and thus modifying the density distribution $Fq(x,y,z)$ thereby to correct the density function $F(x,y,z)$ for expressing the object.

6. A computer aided modeling technique for three-dimensional free-form objects, comprising the steps of:

defining density distribution $F(x,y,z)$ in a three-dimensional space x-y-z;

determining a scalar quantity a;

defining a set of points (x,y,z) satisfying the relation F(x,y,z)=a as a surface of object;

defining a set of points (x,y,z) satisfying the relation F(x,y,z)>a as an inside of object;

defining a set of points (x,y,z) satisfying the relation F(x,y,z)<a as an outside of object;

producing density distribution c(x,y,z) by arranging a field generating primitive prepared by a system or a user in a desired orientation and at a desired position;

generating density distribution Gq(x,y,z) by blending the produced density distribution (x,y,z) and density Fq(x,y,z) (q=1, 2, ..., n) already existing in thespace;

determining data $\Lambda_q$ by sampling up to the mth-order partial derivative of the generated density distribution Gq(x,y,z) on the points included in the set $\Xi_q$ having a finite number of points in the three-dimensional space;

generating smooth density distribution function Fq(x,y,z) for interpolating the sampling data An, and expressing new density distribution Fq(x,y,z) with the generated function thereby to update said density distribution Fq(x,y,z);

assuming that density distribution F(x,y,z) obtained by convex combination of a number of n of smooth functions Fq(x,y,z) (q=1, 2, ..., n) at each coordinate point is density distribution F(x,y,z) for expressing an object;

displaying isosurfaces of said object to evaluate its shape represented by said Fq(x,y,z) density function which is comprised of a convex combination of said updated Fq(x,y,z) density functions; and saving the sampling data in memory when said displayed isosurfaces are satisfactory to the user.

7. A computer aided modeling technique for three-dimensional free-form objects according to claim 6, wherein n=2, and two sets $\Xi_1$ and $\Xi_2$ expressed as follows with respect to three positive numbers $L_X$, $L_Y$, $L_Z$ configure the sets $\Xi_q$ (q=1, 2, ..., n) each having a finite number of points in the three-dimensional space:

$$\Xi_1 = \{(iL_x, jL_y, kL_z) \mid i = 0, 1, \ldots, N_x;$$
$$j = 0, 1, \ldots, N_y; k = 0, 1, \ldots N_z\}$$
$$\Xi_2 = \{((i + 0.5) L_x, (j + 0.5) L_y,$$
$$(k + 0.5) L_z) \mid i = -1, 0, \ldots, N_x;$$
$$j = -1, 0, \ldots, N_y; k = -1, 0, \ldots N_z\}$$

8. A computer aided modeling technique for three-dimensional free-form objects, comprising the steps of:

defining density distribution F(x,y,z) in a three-dimensional space x-y-z;

determining a scalar quantity defining a set of points (x,y,z) satisfying relation F(x,y,z) =a as a surface of object;

defining a set of points (x,y,z) satisfying relation F(x,y,z) >a as an inside of object;

defining a set of points (x,y,z) satisfying relation F(x,y,z) <a as an outside of object;

producing density distribution c(x,y,z) by arranging a field generating primitive prepared by a system or a user in a desired orientation and at a desired position;

blending the produced density distribution c(x,y,z) and density distribution Fq(x,y,z) (q=1, 2, ..., n) already existing in the space using a smooth function $\Psi(\xi,\zeta)$ having two variables $\xi,\zeta$ according to equation Gq(x,y,z)=$\Psi$(Fq(x,y,z), c(x,y,z)) thereby to generate density distribution Gq(x,y,z);

determining sampling data $\Lambda_q$ by sampling up to the mth-order partial derivative of the generated density distribution Gq(x,y,z) on the points included in a set $\Xi_q$ having a finite number of points in the three-dimensional space;

generating a smooth function Fq(x,y,z) for interpolating the sampling data $\Lambda_q$ and expressing new density distribution Fq(x,y,z) by said function thereby to update the density distribution Fq(x,y,z); and assuming that density distribution F(x,y,z) obtained by convex combination of a number n of smooth functions Fq(x,y,z) (q=1, 2, ..., n) at each coordinate point is density distribution F(x,y,z) for expressing an object;

displaying isosurfaces of said object to evaluate its shape represented by said Fq(x,y,z) density function which is comprised of a convex combination of said updated Fq(x,y,z) density functions; and saving the sampling data in memory when said displayed isosurfaces are satisfactory to the user.

9. A computer aided modeling apparatus for three-dimensional free-form objects in which a set of points satisfying relation F(x,y,z)=a is defined as a surface of object, a set of points (x,y,z) satisfying relation F(x,y,z)>a as an inside of object, and a set of points (x,y,z) satisfying relation F(x,y,z)<a as an outside of object, F(x,y,z) being density distribution in a three-dimensional space x-y-z and a being a scalar quantity, comprising:

producing means for arranging a field generating primitive prepared by a system or a user in a desired orientation and at a desired position thereby to produce density distribution c(x,y,z);

generating means for blending the produced density distribution c(x,y,z) and density distribution Fq(x,y,z) (q=1, 2, ..., n) already existing in the space using a smooth function $\Psi(\xi,\zeta)$ having two variables $\xi, \zeta$ according to equation Gq(x,y,z)=$\Psi$(Fq(x,y,z), c(x,y,z)) thereby to generate density distribution Gq(x,y,z);

sampling data computing means for sampling up to the mth-order partial derivative of the generated density distribution $G_q$(x,y,z) on the points included in a set $\Xi_q$ having a finite number of points in the three-dimensional space and determining sampling data $\Lambda_q = \{\mu_p(i,j,k) = \{1/(i!j!k!)\} \partial^{i+j+k} G_q(x_p, y_p, z_p)/\partial x^i \partial y^j \partial z^k | i+j+k=0, 1, \ldots, m, i \geq 0, j \geq 0, k \geq 0;$ all the points P=$(x_p, y_p, z_p)$ included in $\Xi_q\}$) ; and updating means for generating a smooth function Fq(x,y,z) for interpolating the determined sampling data $\Lambda_q$ and expressing new density distribution Fq(x,y,z) with the generated function thereby to update said density distribution Fq(x,y,z), and assuming that the convex combination of a number n of smooth functions Fq(x,y,z) (q=1, 2, ..., n) at each coordinate point as density distribution F(x,y,z) representing for an object;

means for displaying isosurfaces of said object to evaluate its shape represented by said Fq(x,y,z) density distribution functions which is comprised of a convex combination of said updated Fq(x,y,z) density distribution functions;

means for altering the parameters of the c(x,y,z) density function while viewing said isosurfaces; and means for saving the sampling data in memory when said displayed isosurfaces are satisfactory to the user.

10. A computer aided modeling apparatus for three-dimensional free-form objects according to claim 9, wherein n=2, and two sets $\Xi_1$, $\Xi_2$ expressed by the following equations with respect to three positive numbers $L_X$, $L_Y$, $L_Z$ configure sets $\Xi q$ (q=1, 2, ..., n) each having a finite number of points in the three-dimensional space:

$$\Xi_1 = \{(iL_x, jL_y, kL_z) \mid i = 0, 1, \ldots, N_x;$$
$$j = 0, 1, \ldots, N_y; k = 0, 1, \ldots N_z\}$$
$$\Xi_2 = \{((i + 0.5) L_x, (j + 0.5) L_y,$$
$$(k + 0.5) L_z) \mid i = -1, 0, \ldots, N_x;$$
$$j = -1, 0, \ldots, N_y; k = -1, 0, \ldots N_z\}$$

11. A computer aided modeling apparatus for three-dimensional free-form objects in which, a set of points (x,y,z) satisfying relation F(x,y,z)=a, where F(x,y,z) is density distribution in a three-dimensional space x-y-z, and a is a scalar quantity, is defined as a surface of object, a set of points (x,y,z) satisfying relation F(x,y,z)>a as an inside of object and a set of points (x,y,z) satisfying relation F(x,y,z)<a as an outside of object, comprising:

producing means for producing density distribution c(x, y,z) by arranging a field generating primitive prepared by a system or a user in a desired orientation and at a desired position;

generating means for generating density distribution Gq(x,y,z) by blending the produced density distribution c(x,y,z) and density distribution Fq(x,y,z) (q=1, 2, ..., n) already existing in the space;

sampling data computing means for determining sampling data $\Lambda_q$ by sampling up to the mth-order partial derivative of the generated density distribution Gq(x, y,z) on the points included in a set $\Xi_q$ having a finite number of points in the three-dimensional space; and updating means for generating a smooth function Fq(x,y, z) for interpolating the determined sampling data $\Lambda_q$ and expressing new density distribution Fq(x,y,z) by the generated function thereby to update said density distribution Fq(x,y,z), and assuming that the convex combination of a number n of smooth functions Fq(x, y,z) (q=1, 2, ..., n) at each coordinate point is density distribution F(x,y,z) for expressing an object;

means for displaying isosurfaces of said object to evaluate its shape represented by said Fq(x,y,z) density distribution functions which is comprised of a convex combination of said updated Fq(x,y,z) density distribution functions;

means for altering the parameters of the c(x,y,z) density function while viewing said isosurfaces; and means for saving the sampling data in memory when said displayed isosurfaces are satisfactory to the user.

* * * * *